INVENTOR.
Evan E. Dorkins.
BY
Fishburn and Gold
ATTORNEYS.

3,002,354
MOVEMENT CONTROL APPARATUS
Evan E. Dorkins, Ottawa, Kans., assignor to Young Spring & Wire Corporation, Detroit, Mich., a corporation of Michigan
Filed May 3, 1960, Ser. No. 26,542
11 Claims. (Cl. 60—52)

This invention relates to control apparatus for regulating movement of a work member under an applied force, and more particularly to a fluid pressure actuated control that is selectively operable manually or automatically for controlling movement of a work member.

The principal objects of the present invention are to provide an improved apparatus for controlling movement of a work member by a fluid actuated motor with periodic movements by means of fluid valves and metering devices connected to displace a given quantity of fluid for each period of actuation of the work member; to provide such an apparatus with controls selectively actuated either manually or automatically; to provide such a control apparatus which in automatic operation utilizes a portion of a fluid pressure supply with metering devices for actuating a timing control for the actions of the work member; to provide such an apparatus with one or more flow control valves for regulating the flow of fluid to and from the timing device; to provide such a control apparatus which may be instantly changed from manual to automatic or from automatic to manual operation; to provide such a control apparatus wherein automatic operation flow of fluid pressure to and from the actuating motor is controlled by a sequence valve which is actuated by fluid pressure from a pilot valve which, in turn, is actuated by a timing control to regulate the period of action of the work member; and to provide an improved control apparatus for controlling movement of a work member by means of fluid metering and actuated devices that is positive in operation and easily adjustable for varying actions of the work member.

Other objects and advantages of this invention will become apparent from the following description taken in connection with the accompanying drawings wherein are set forth by way of illustration and example certain embodiments of this invention.

Figure 1:
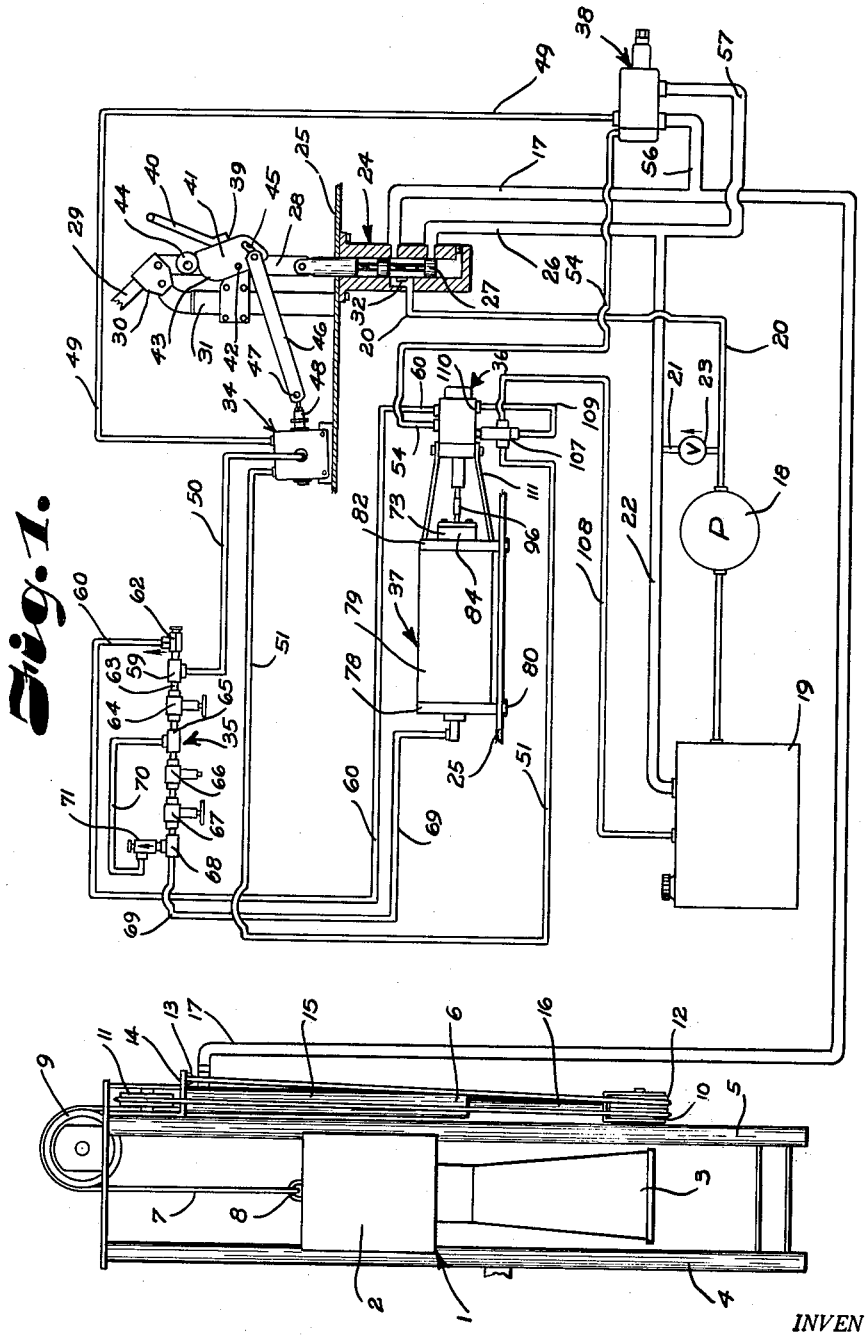
FIG. 1 is a diagrammatic illustration of a work member and control apparatus involving my invention.

Referring more in detail to the drawings:

This invention will be described for a work member, such as a drop hammer, operatively connected to a fluid actuated motor wherein the work member or hammer applies a force in one direction on said fluid motor, but it will be understood that in its broader aspects the invention is not limited to this particular use and is adapted for other types of fluid motors with various operating connections for movable work members.

In the apparatus illustrated, the movable work member 1 includes a weight 2 having a hammer attachment 3 or other suitable tool secured thereon, said weight being slidable in ways or trackways 4 and 5 arranged in a generally upright position whereby the weight and hammer tends to move downwardly or drop along said ways under influence of gravity. The work member is operatively connected to a fluid motor 6 as by means of a flexible rope 7 having one end connected as at 8 to the work member or weight 2 and extending upwardly therefrom and over multiple pulleys as, for example, over a sheave or pulley 9, then downwardly under a lower sheave or pulley 10, and upwardly over a second upper sheave or pulley 11, and downwardly under a second lower sheave or pulley 12, with the other end connected as at 13 to a fixed anchor member or bracket 14 secured to the track or way 5.

The fluid motor is in the form of a hydraulic jack or ram having a cylinder 15 with one end connected to the bracket 14 and with a piston actuated piston rod 16 extending from the other end of said cylinder with the lower sheaves or pulleys 10 and 12 carried by the piston rod at the end thereof remote from the cylinder 15. Fluid pressure delivered to the cylinder 15 through a duct 17 extends the hydraulic jack or motor, and through the rope connection 7 the extension of said jack raises the weight and hammer upwardly in the ways 4 and 5. Closing the duct 17 traps the fluid in the cylinder 15 to hold the hammer at its selected elevation, and opening the duct 17 to a tank or other disposal of the fluid pressure allows the hammer to descend. The duct 17 and connections therefor are preferably large whereby the hydraulic fluid or liquid will flow therethrough from the cylinder 15 for substantially free falling of the hammer structure. Varying the extension of the jack or motor 6 will vary the height to which the hammer and weight are elevated and will thereby vary the impact delivered by the dropping of same. While a single acting hydraulic jack is illustrated in connection with the hammer structure, it is to be understood that other conventional types of hydraulic motors of the oscillating or reciprocating type may be utilized with various operative connections to effect movement of movable work members.

A suitable source of fluid pressure such as a pump 18 is provided for delivering fluid under pressure from a reservoir or tank 19 to a pressure supply pipe 20. The pump 18 may take any convenient or desirable form and may be driven from any suitable source of power. A bypass line 21 connects the pressure line 20 with a return line 22 through a relief valve 23 in the bypass line 21 whereby if the pressure in the pressure supply line 20 exceeds a predetermined value, the valve 23 opens to allow flow of excess fluid pressure through the bypass line 21 to the return line 22 which is connected with the tank 19 for return of the fluid thereto. The bypass may be built into the pump, if desired.

Figure 2:
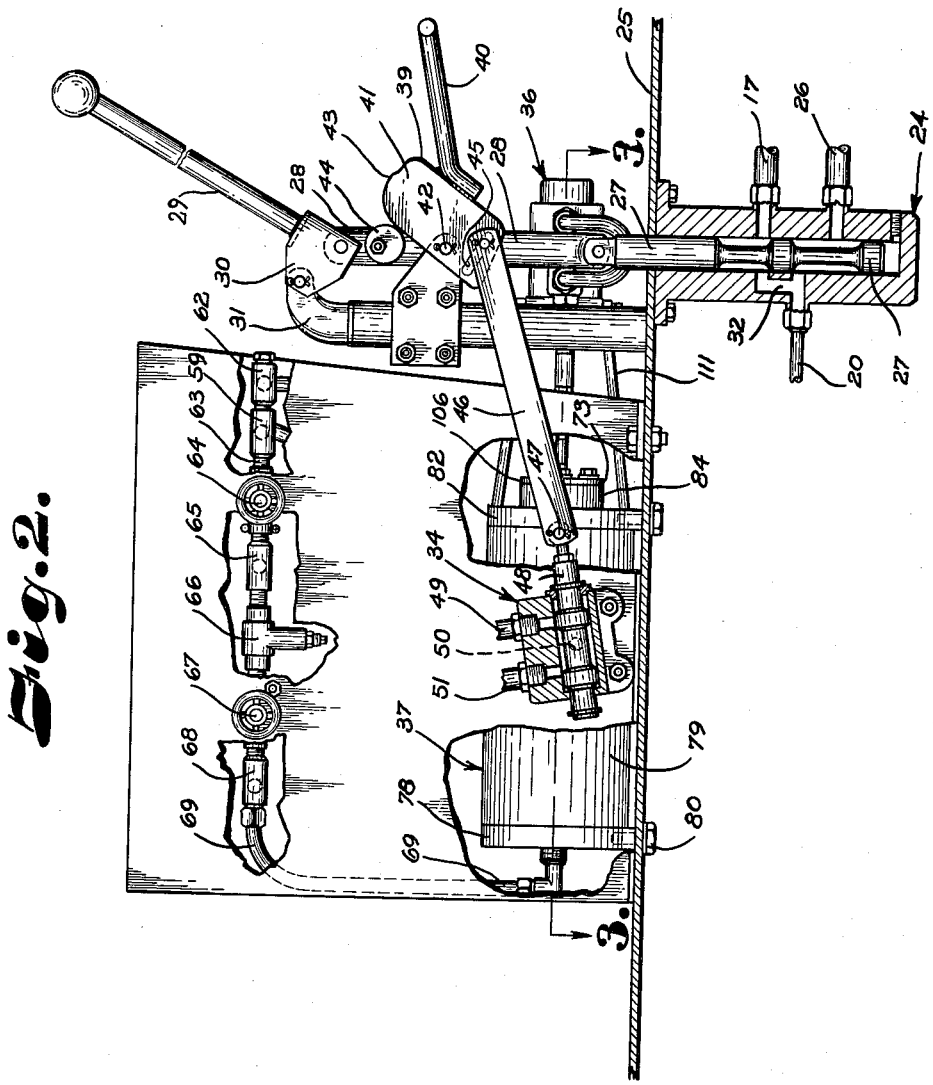
FIG. 2 is a side elevational view of parts of the control apparatus and valve with portions broken away to illustrate the structure and arrangement thereof.

A main or manually controlled valve 24 is supported on a frame 25. The main valve 24 is connected to the pressure supply line 20 and is also connected to a branch 26 of the return line 22 and is connected through the duct 17 for communication with the fluid motor 6. When the valve plunger 27 is in the position illustrated in FIG. 2, which is in hammer dropping position, the fluid pressure supply from the pump 18 flows through the line 20 and through the valve 24, branch 26 and return line 22 to the tank 19 and fluid pressure in the motor 6 flows through the duct 17 and main valve 24 to the tank 19. The plunger 27 is connected by a link 28 to a manual control valve lever 29 pivotally mounted as at 30 on a bracket 31 supported on the frame 25. When the valve lever 29 is swung to move the valve plunger 27 to a position as illustrated in FIG. 1, flow to the branch 26 of the return line is closed and fluid pressure from the line 20 flows through the valve 24 and into the duct 17 whereby the fluid pressure is delivered to the fluid motor 6 effecting extension of same and lifting of the hammer structure 3 and weight 2. Moving the lever 29 to an intermediate position will close the communication with the duct 17 to stop flow of fluid to and from the fluid motor 6 to hold the hammer in the selected elevated position. Swinging the valve lever 29 to the position illustrated in FIG. 2 provides communication from the duct 17 and through the valve 24 and passage 32 therein to the branch 26 and return line 22 whereby the fluid pressure in the fluid motor 6 is quickly discharged therefrom for substantially free falling of the weight 2 and hammer 3. Movement of the valve lever 29 thereby gives manual control of the fluid pressure supply to the fluid motor 6 and the action of the work member or hammer.

For automatic operation, the control apparatus includes a selector valve 34, a diverter and metering series 35, a pilot valve 36, a time control device 37, and a flow control or sequence valve 38 connected in a fluid circuit for automatic timed actions of the work member 1. The selector valve 34 is actuated by a selector lever 39 adapted to be actuated to take the control from the manual lever 29 for automatic operation or restore the control to the manual operation. The selector lever 39 has an arm 40 attached to a cam member 41 pivotally mounted as at 42 on the bracket 31 with a cam surface 43 engaging a roller 44 mounted on the link 28 whereby when the selector lever 39 is moved to automatic operation position, the cam engages the roller 44 to raise the link 28 and swing the lever 29 to position the plunger 27 in the valve 24 whereby fluid pressure from the line 20 is communicated through the valve to the duct 17 and the return line branch 26 is closed. When the selector lever 39 is moved to manual operating position, the cam surface 43 is disengaged from the roller 44, as illustrated in FIG. 2. The cam member 41 has a lost motion connection 45 consisting of a pin and slot arrangement with a link 46 which is pivotally connected as at 47 to the plunger 48 of the selector valve 34 whereby the selector lever 39 is moved through the portion of its swing wherein the manual lever 29 moves the plunger 27 to intermediate position, and then on further movement to the positioning of the valve plunger 27 as shown in FIG. 1 the cam member moves the link 46 and valve 48 to position said valve plunger 48 for communication between a fluid pressure diverter line 49 to a metering or regulator valve supply line 50 and close a return line 51 to the tank. The selector valve, when the plunger thereof is positioned for manual operation, provides communication from the metering supply line 50 through the valve to the return line 51 and closes the port leading from the pressure diverter line 49, as illustrated in FIG. 2.

Figure 5:
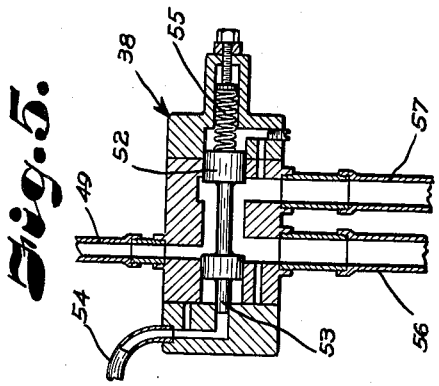
FIG. 5 is a diagrammatic sectional view through the sequence valve.

The sequence valve 38 has a valve plunger 52 with a pilot piston 53 against which pressure from a pilot valve 36 is communicated through a line 54 to move the plunger 52 when the pressure from the pilot valve is sufficient to overcome the pressure of a spring or resilient member 55 to move the plunger 52 in the position illustrated in FIG. 5, wherein there is communication from a branch duct 56 that is relatively large in size and communicating with the large duct 17 through the valve to a branch return line 57 that has communication with the return line 22, and also with the diverter pressure line 49. When the pressure from the pilot valve 36 is insufficient to overcome the spring 55, the valve plunger 52 is moved by the spring to close communication through the return branch line 57 and provide for fluid pressure flow from the duct 17 through the branch 56 and sequence valve 38 and diverter pressure line 49 to the selector valve 34.

The pressure or metering supply line 50 communicates through a fitting 59 with a flow line 60 which communicates with the pilot valve 36 to supply fluid pressure thereto through a port 61. The line 60 has a check valve 62 therein to prevent any backflow toward the fitting 59, thereby permitting flow only in a direction toward the pilot valve 36. The pressure line 50 also communicates through the fitting 59 with the metering apparatus 35 through a pipe 63 leading to a first metering valve 64 such as an adjustable needle valve from which the flow passes through a fitting 65, a second metering valve 66 and a third adjustable metering valve 67, such as a needle valve, and a fitting 68 in series for flow from the pressure line 50 to a time control supply line 69. The second metering valve 66 supplements the metering valve 67 by providing some pressure drop between the valve 64 and the valve 67. A return or bypass line 70 is connected to the fitting 68 to provide communication therefrom to the fitting 65, there being a check valve 71 in the bypass line 70 that permits flow through said bypass only in the direction from the fitting 68 to the fitting 65, bypassing the metering or needle valves 66 and 67. It is preferable that the metering valve 64 be adjusted to permit greater flow therethrough than the metering valves 66 and 67 whereby the rate of flow of pressure to the time control supply line 69 is less than the rate of return flow around the metering valves 66 and 67 as the return flow is metered only by the metering valve 64 while the supply is metered by both the metering valve 64 and the reduced rate metering valves 66 and 67. The pressure supply delivered by the time control supply pipe 69 is delivered to the time control device 37 now to be described.

Figure 3:
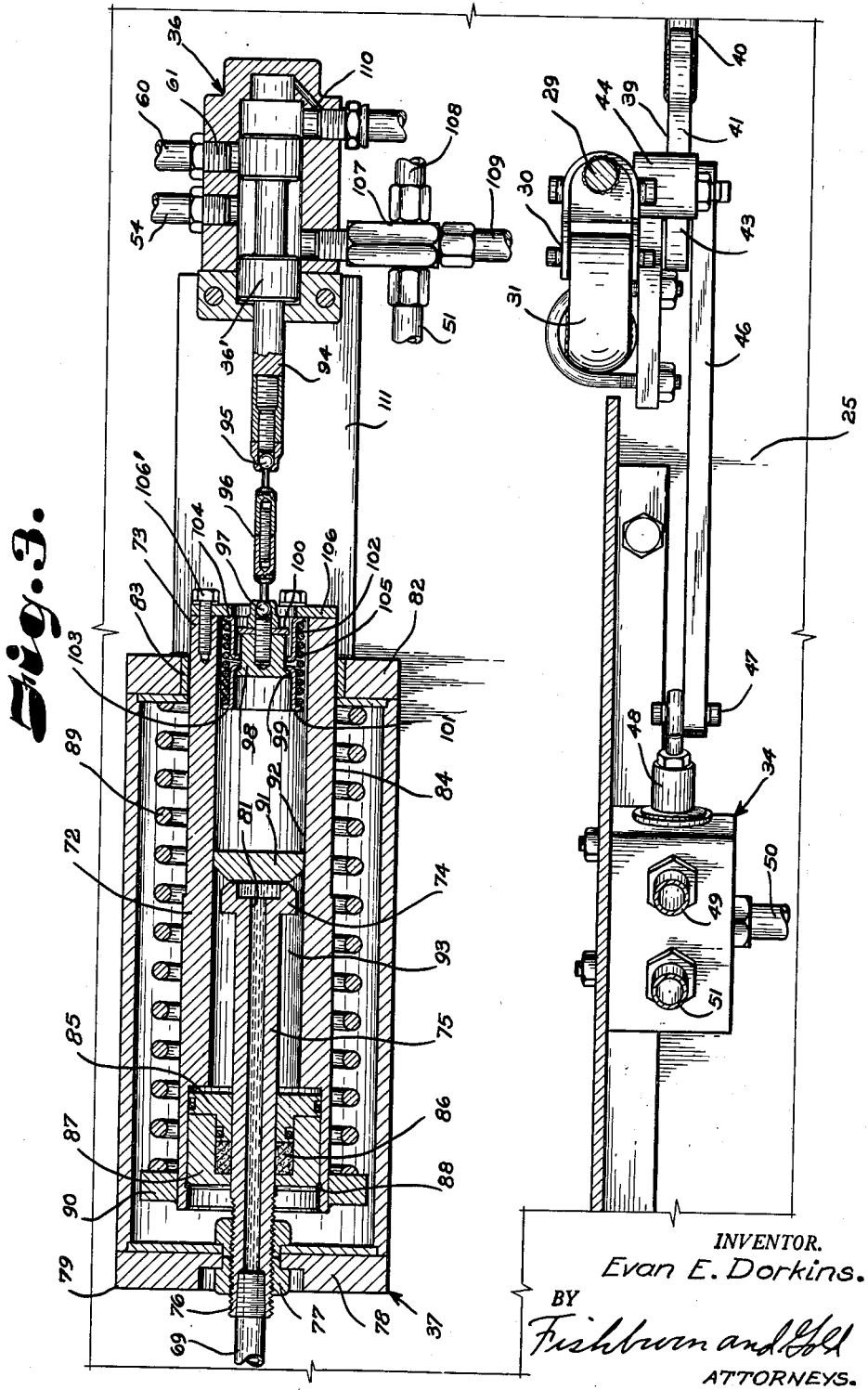
FIG. 3 is a longitudinal sectional view through the control apparatus taken on the line 3—3, FIG. 2.

The time control device 37 consists of an extensible member 72 having one member 73 thereof provided with a lost motion connection with the plunger 36' of the pilot valve 36, the other member of the extensible member 72 being supported in stationary relationship as, for example, to the frame 25. In the illustrated structure, the etxensible member 72 consists of a cylinder member 73 as a movable member and a stationary member or piston 74. The piston 74 has a hollow piston rod 75 with the end 76 thereof extending from the cylinder fixed to collars 77 carried by an end wall 78 of a housing 79 mounted on the frame 25 by suitable fastening devices such as bolts 80. The piston rod 75 has a through bore 81 with the end thereof at the end 76 of said rod communicating with the supply line 69. The housing 79 has another end wall 82 spaced from the end wall 78 and provided with a bearing 83 slidably mounting the cylinder 73 for longitudinal movement therein, said bearing 83 slidably engaging the outer surface 84 of the forward portion of the cylinder 73. The other or rearward portion of the cylinder 73 has a bearing member 85 therein sleeved on the piston rod 75 to slidably support the cylinder thereon. Suitable packing 86 is positioned in the cylinder surrounding the piston rod 75 and is held compressed between the bearing member 85 and a gland 87 secured in the rear end portion of the cylinder by suitable fastening means such as a spring retainer ring 88. A spring 89 is sleeved on the cylinder with one end engaging the end wall or member 82 of the housing 79 and the other end engaging an outwardly extending annular flange or collar 90 on the rear portion of the cylinder whereby said spring urges the cylinder rearwardly or toward the end 78 of the housing 79 in which position the head or piston 74 is substantially midway the length of the cylinder member and substantially engaged with a partition 91 secured in the bore 92 of said cylinder to define a fluid receiving compartment 93 between the partition 91 and the bearing member 85. The plunger 36' of the pilot valve has an extension 94 provided with a flexible joint or connection 95 with one end of a turnbuckle or adjustable link 96 which has its other end provided with a flexible connector or joint 97 with a spool 98 having annular outwardly extending flange portions 99 and 100 at its respective ends. The portion of the spool 98 between the annular flanges is slidably mounted in adjacent ends of cup members 101 and 102 which have outwardly annular flanges 103 and 104 at their respective outer end engaged by end portions of a spring 105 sleeved on said cup members between said outer flanges whereby said spring urges relative axial movement to separate said cup members. The forward flange 104 of the cup member 102 engages a retainer ring 106 suitably secured on the forward end of the cylinder 73 by suitable fastening devices such as bolts 106'. When the cylinder 73 of the timing control device is positioned as illustrated in FIG. 3, as with zero or insufficient pressure in the compartment 93 to overcome the spring 89, the pilot valve plunger 36' is in a position to close or shut off flow of fluid pressure from the pressure line 60 and provide communication between the pilot pressure line 54 through the valve to a manifold 107 having connection through a return line 108 to the tank 19. Said manifold also has communication with the return line 51 and with a line 109 which has communication with a port 110 in the forward end of the pilot valve to provide for drainage therefrom.

Figure 4:
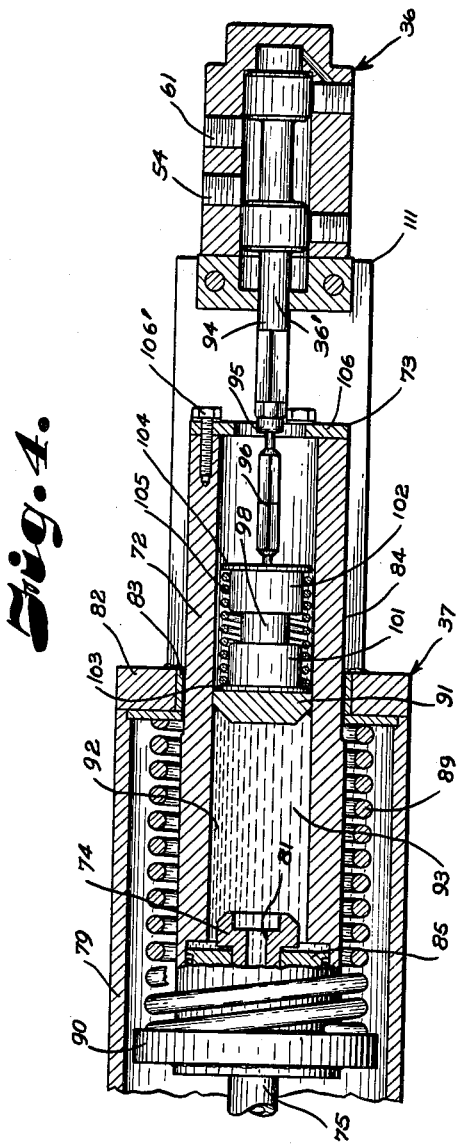
FIG. 4 is a partial longitudinal sectional view through the pilot valve and time control device therefor.

When pressure is supplied from the control supply line 69 to the compartment 93 to overcome the spring pressure 89, the effective area acted upon by said pressure in the compartment 93 of the partition 91 is greater than the effective area of the pressure acting on the bearing member 85 which forms the other end of said compartment, whereby the differential pressure overcoming said spring 89 moves the cylinder member 93 toward the pilot valve 36 that is supported in fixed relation to the housing 79 by means of arms 111. The movement of the cylinder 73 toward the pilot valve is free relative to the cup members 101 and 102 and the spring thereon whereby the pilot valve plunger remains in the same position as illustrated in FIG. 3. When the cylinder 73 has moved sufficiently for the partition 91 to engage the flanges 103 on the cup member 101, the cup member 102 will be engaged with the other end of the spool 98 and continued movement of the cylinder toward said other end of the spool 98 will act through the spring 105, cup 102 and the flange 100 and move the plunger 36' of the pilot valve to the position illustrated in FIG. 4 wherein communication to the manifold 107 and return lines connected thereto is closed and communication is provided between the pressure supply line 60 and the pilot supply line 54. Any further movement of the cylinder 73 toward the pilot valve will be taken up by compression of the spring 105 to move the cups 101 and 102 toward each other to allow for any time lag in cutting off of addition pressure supply to the cylinder 73 of the time control device 37. When pressure is relieved from the compartment 93, the spring 89 urges the cylinder 73 rearwardly but the pilot valve plunger remains in the position illustrated in FIG. 4 until the retainer plate or ring 106 engages the flange portion 104 of the cup member 102 to start return movement of the pilot valve plunger to the position illustrated in FIG. 3. The spring and two cup arrangement of the cups 101 and 102 and spring 105 provides a lost motion connection permitting further movement of the cylinder in the rearward direction to absorb time delay and prevent damage to the equipment in the same manner as described relative to the motion at the other end of the stroke.

*Operation*

In operating a control apparatus constructed and assembled and connected as described, and with the pump 18 operated to supply fluid pressure to the line 20, and the manual control lever 29 positioned as illustrated in FIG. 2, the fluid flow is from the pump through the line 20, valve 24, return line branch 26, return line 22 to the tank 19. The selector valve 34 is positioned as illustrated in FIG. 2, the pilot valve 36 is positioned as illustrated in FIG. 3, and the sequence valve 38 has the plunger thereof closing communication to the return line 57, and while there is communication between the branch pressure line 56 and the diverter pressure line 49, there is no effective pressure therein, and the selector valve closes communication from the pressure line 49. Then, on actuation of the manual control lever 29, there is manual control of the fluid delivery and return from the hydraulic motor 6 to control the action of the work member 1 or hammer 2 and weight 3. At any time, and at any position of the work member, if it is desired to have automatic operation with timed actions of the work member, the selector lever 40 is swung to move the cam member 41 to the position illustrated in FIG. 1, whereby the cam surface 43 engages the roller 44 to move the lever 29 to the position illustrated in FIG. 1, whereby through the link 28 the plunger 24 of the main valve is moved to the position illustrated in FIG. 1 wherein fluid pressure from the pump is delivered through the line 20 to the valve 24, but the return line branch 26 is closed, and the fluid pressure flows to the duct 17 whereby the fluid pressure delivered by the pump is utilized to effect extension of the motor 6 or actuation of the fluid motor 6 to start movement of the work member, as, for example, raising of the hammer 3 in the ways 4 and 5. The movement of the selector lever 40 also moves the link 46 to shift the plunger 48 of the selector valve 34 whereby a portion of the fluid pressure supply in the pressure line 17 flows through the branch 56, sequence valve 38 and diverter pressure line 49 and selector valve 34 to the pressure line 50, communication through the selector valve 34 with the return line 51 being closed. The flow from the selector valve through the line 50 flows through the metering valve 64 of the metering apparatus and then through the metering valves 66 and 67 and time control supply line 69 through the bore in the piston rod and into the compartment 93 to start movement of the cylinder 73 substantially simultaneously with the starting of the upward movement of the hammer 3. The rate of movement of the cylinder 73 is regulated by the quantity of the fluid flowing through the metering apparatus, and particularly the metering valve 67 which adjusts the proportion of the fluid pressure supply from the pump delivered to the compartment 93 relative to the quantity delivered to the fluid motor 6. The proportion of the fluid that is delivered to the compartment 93 is such that when the hammer has reached the desired height the partition 91 in the cylinder 73 engages the flange of the cup member 101 and effects movement thereof to move the pilot valve plunger 36' to the position illustrated in FIG. 4, whereby fluid pressure flows from the pressure line 50 through the check valve 62 and pilot supply line 60 to the pilot valve where the return connection through the manifold 107 is closed and communication is provided to the pilot pressure line 54 to apply pressure to the pilot piston 53 moving the sequence valve plunger 52 to the position illustrated in FIG. 5. There is then communication from the fluid motor 6 through the duct 17, branch 56, sequence valve 38, return branch 57 and return line 22 to the tank, and also communication from the line 49 through the sequence valve and branch 57 and return line 22 to the tank. The weight 2 and hammer 3 applying force to the fluid motor 6 discharges the fluid therefrom, and the duct 17 and branch 57 and return line 22 being very large in size allows said discharge from the fluid motor to be substantially with no resistance permitting substantially free falling of the hammer. This position of the sequence valve plunger communicates the pressure line 49 with the return to the tank and stops the supply of pressure through the selector valve 34 which results in stopping the supply of pressure to the compartment 93 of the time control device. However, the sequence valve remains in the position illustrated in FIG. 5 as the pressure against the pilot piston 53 is trapped since the check valve 62 holds the pressure in the pilot supply line 60 through the pilot valve and the pilot supply line 54 thereby preventing action of the sequence valve that might stop the hammer in its fall. As the hammer is falling, and with the supply of fluid pressure to the timing control stopped, the spring 89 acting on the cylinder 73 urges the same rearwardly forcing fluid from the compartment 93 through the hollow piston rod, line 69, fitting 68, check valve 71, bypass line 70, as well as restricted flow through metering valves 67 and 66 and then through fitting 65, metering valve 64 fitting 59, and pressure line 50, through the selector valve 34 and diverter pressure line 49 and sequence valve to the branch 57 and return line 22 to the tank 19. The rate of discharge of the fluid from the compartment 93 is regulated by the metering valve 64 to provide a desired time interval before starting the next upstroke of the hammer, the liquid supplied by the pump during that interval passing from the supply line 20 through the main valve 24, duct 17, branch 56 and sequence valve 38, branch 57 and return line 22, to the tank 19. As the cylinder 73 approaches the rearward end of its stroke, the retainer ring 106 engages the cup member 102, and through the engagement thereof with the spool 98 moves the plunger 36′ of the pilot valve back to the position illustrated in FIG. 3, providing communication of the pressure on the pilot piston 53 through the line 54, pilot valve 36, to the manifold 107 and return line 108 whereby said pressure on the sequence valve piston is returned to the tank, the spring moving the sequence valve back to the position wherein the return line branch 57 is closed and the supply from the pump 18 is again delivered through the duct 17 to the fluid motor 6 to start raising the hammer 3, and the fluid supply also is delivered through the line 49 and selector valve 34 to again start forward movement of the cylinder 73.

The automatic movement of the work member or hammer structure is continued in the periodic operation for repeated actions at the time intervals selected and provided by the adjustment of the metering valves 64 and 67. If it is desired that the hammer have less height in its elevation and thereby less impact, the metering valve 67 is opened to provide increased rate of flow and increased proportion of the total fluid supply from the pump to the time control device whereby the cylinder 73 completes its forward movement to actuate the pilot valve and, in turn, the sequence valve, as above described, in a shorter period of time whereby the fluid motor is supplied with sufficient fluid pressure to lift the hammer or work member a portion of its possible height before the sequence valve is opened for the dropping of the hammer. The metering valve 67 should be adjusted to provide for lesser flow than will flow through the metering valve 64 as it is generally desirable that the time required for lifting of the hammer be greater than the interval during which the hammer will rest on the ground before starting its next cycle. The capacity of the compartment 93 in the time control device is preferably relatively small compared to the capacity of the fluid motor 6 in its movement for full lifting of the hammer as, for example, 1/10 or 1/20 of the motor capacity whereby there is only a small proportion of the fluid pressure supply diverted for the control, and this small capacity permits very close adjustment of the metering valves 64 and 67 for substantially any desired variation in the lift of the hammer and the frequency of its actions. The automatic operation may be continued as desired while the manual control may be taken over at any time by swinging of the selector lever 40 to move the cam member 41 to the position illustrated in FIG. 2 whereby the manual control lever 29 and the plunger 27 of the main control valve 24 are returned to the position illustrated in FIG. 2, which will permit the hammer to drop from whatever height it is then elevated. In the event the hammer is in elevated position when the control is moved to manual position, and the cylinder 73 is in its forward position, the movement of the selector lever 40 will, through the link 46, shift the selector valve plunger 48 to the position illustrated in FIG. 2, providing communication of the pressure line 50 through the selector valve to the return line 51 whereby fluid in the cylinder compartment 93 will flow back through the hollow piston rod, pressure line 69, bypass 70, metering valves 67, 66 and 64, line 50, selector valve 34 and return line 51 to the manifold 107 and return line 108 to the tank 19 whereby the cylinder moves rearwardly to the end of its stroke moving the pilot valve plunger 36′ to the position illustrated in FIG. 3 whereby the pressure on the sequence valve piston 53 is bled through the line 54 and pilot valve 36 to the manifold 107 and return line 108 to the tank 19 permitting the spring 55 to return the sequence valve plunger 52 to close the return line branch 57. Then the apparatus is in position for continued manual operation in controlling of the action of the work member.

It is believed obvious that this control system provides an arrangement for quickly changing from manual to automatic operation and from automatic operation to manual operation, with substantially positive control and timing of sequence of operation of movable work members with a wide variety in the periods and extent of the action of the work member.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a device for controlling movement of a work member, a fluid motor operatively connected to the work member and responsive to fluid pressure for moving said work member, means including a supply conduit to supply fluid under pressure to said motor, a reservoir, a return conduit communicating with said reservoir, a flow control means in said supply conduit and connected to said return conduit and operative to communicate said fluid supply means with said motor in one position and to communicate said motor with the reservoir in another position whereby the fluid supply to said motor will move the work member when the fluid control means is in said one position, an actuator operatively connected to said flow control means and responsive to a predetermined quantity of fluid flowed to and from said actuator to move the flow control means to said respective positions, flow means communicating said fluid supply conduit with said actuator for flow of fluid to and from same, first and second fluid metering devices in series in said flow means whereby the volume of fluid metered thereby to said actuator is proportional to the movement of the work member, and a bypass including a check valve around said second metering device whereby the flow of fluid from said actuator is metered only by said first metering device to provide a predetermined time interval between the movement of the flow control means by the actuator from said other position to said one position.

2. In a device for controlling movement of a work member subjected to force normally urging it in one direction, a fluid motor operatively connected to the work member and responsive to fluid pressure for overcoming said force and moving said work member in the opposite direction, means including a supply conduit to supply fluid under pressure to said motor, a reservoir, a return conduit communicating with said reservoir, a flow control means in said supply conduit and connected to said return conduit and operative to communicate said fluid supply means with said motor in one position and to communicate said motor with the reservoir in another position whereby the force urging said work member will move same in said one direction when the flow control means is in said other position and the fluid supply to said motor will move the work member in said other direction when the fluid control means is in said one position, an actuator operatively connected to said flow control means and responsive to a predetermined quantity of fluid whereby when said said predetermined quantity of fluid is delivered to said actuator the flow control means is moved to said other position and when said predetermined quantity of fluid is removed from said actuator the flow control means is moved to said one position, flow means communicating said fluid supply conduit with said actuator for delivery of fluid under pressure to said actuator when the flow control means is in said one position and for flow of fluid from said actuator when the flow control means is in said other position, first and second fluid metering devices in series in said flow means whereby the volume of fluid metered thereby to said actuator is proportional to the movement of the work member, and a bypass including a check valve around said second metering device whereby the flow of fluid from said actuator is metered only by said first metering device to provide a predetermined time interval between the movement of the flow control means by the actuator from said other position to said one position.

3. In a device for controlling movement of a work member subjected to force normally urging it in one direction, a hydraulic motor operatively connected to the work member for effecting movement of said work member in the opposite direction in response to fluid pressure delivered to said motor and permitting the work member to move in said one direction in response to flow of fluid from said motor; a fluid reservoir, means including a supply conduit to supply fluid from the reservoir under pressure to said motor, a return conduit having communication with said reservoir, a flow control means in said supply and return conduits and movable to effect communication from the fluid pressure supply means to the hydraulic motor to apply fluid pressure thereto in one position and to communicate said hydraulic motor with the reservoir in the other position for relieving said hydraulic motor of fluid pressure, an actuator operatively connected to said flow control means and responsive to a predetermined quantity of fluid whereby when said predetermined quantity of fluid is delivered to said actuator the flow control means is moved to said other position and when said predetermined quantity of fluid is removed from said actuator the flow control means is moved to said one position, flow means connected with said flow control means for communicating said fluid supply with said actuator for delivery of fluid under pressure thereto when said flow control means is in said one position and for removal of fluid from said actuator when said flow control means is in said other position, resilient means operatively connected with said actuator for urging said fluid therefrom, first and second fluid metering devices in series in said flow means whereby the volume of fluid metered thereby to said actuator is proportional to the movement of the work member, a bypass including a check valve around said second metering device whereby the flow of fluid from said actuator is metered only by said first metering device to provide a predetermined time interval between the movement of the flow control means by the actuator from said other position to said one position.

4. In a device for controlling movement of a work member, a fluid motor operatively connected to the work member for effecting movement of said work member in response to fluid pressure delivered to said motor, a fluid reservoir, means including a supply conduit to supply fluid from the reservoir under pressure to said motor, a return conduit having communication with said reservoir, a flow control means in said supply and return conduits and movable to effect communication from the fluid pressure supply means to the fluid motor to apply fluid pressure thereto in one position and to communicate said fluid motor with the reservoir in the other position for relieving said fluid motor of fluid pressure, an actuator operatively connected to said flow control means and responsive to a predetermined quantity of fluid flowed to and from said actuator to move the flow control means to said respective positions, flow means connected with said flow control means for communicating said fluid supply with said actuator for delivery of fluid under pressure thereto when said flow control means is in said one position and for removal of fluid from said actuator when said flow control means is in said other position, resilient means operatively connected with said actuator for urging said fluid therefrom, a fluid metering device in said flow means whereby the volume of fluid metered thereby to said actuator is proportional to the movement of the work member, a selector valve means in said flow means, a manually operable main valve in said supply and return conduits and operable when said flow control means is in said one position to selectively effect delivery of fluid pressure from said supply means to said motor and flow of fluid from said motor to said reservoir, and a selector lever means connected with said selector valve means and said main valve to actuate said selector valve means to open said flow means for flow therethrough and deactivate the main valve.

5. In a device for controlling movement of a work member, a fluid motor operatively connected to the work member for effecting movement of said work member in response to fluid pressure delivered to said motor, a fluid reservoir, means including a supply conduit to supply fluid from the reservoir under pressure to said motor, a return conduit having communication with said reservoir, a flow control means in said supply and return conduits and movable to effect communication from the fluid pressure supply means to the fluid motor to apply fluid pressure thereto in one position and to communicate said fluid motor with the reservoir in the other position for relieving said fluid motor of fluid pressure, an actuator operatively connected to said flow control means and responsive to a predetermined quantity of fluid flowed to and from said actuator to move the flow control means to said respective positions, flow means connected with said flow control means for communicating said fluid supply with said actuator for delivery of fluid under pressure thereto when said flow control means is in said one position and for removal of fluid from said actuator when said flow control means is in said other position, resilient means operatively connected with said actuator for urging said fluid therefrom, a fluid metering device in said flow means whereby the total volume of fluid metered thereby to said actuator is proportional to the total selected movement of the work member, a bypass including a check valve around said metering device whereby the flow of fluid from said actuator provides a predetermined time interval between the movement of the flow control means by the actuator from said other position to said one position, a selector valve means in said flow means, a manually operable main valve in said supply and return conduits and operable when said flow control means is in said one position to selectively effect delivery of fluid pressure from said supply means to said motor and flow of fluid from said motor to said reservoir, and a selector lever means connected with said selector valve means and said main valve to actuate said selector valve means to open said flow means for flow therethrough and deactivate the main valve.

6. In a device for controlling movement of a work member subjected to force normally urging it in one direction, a hydraulic motor operatively connected to the work member for effecting movement of said work member in the opposite direction in response to fluid pressure delivered to said motor and permitting the work member to move in said one direction in response to flow of fluid from said motor, a fluid reservoir, means including a supply conduit to supply fluid from the reservoir under pressure to said motor, a return conduit having communication with said reservoir, a flow control means in said supply and return conduits and movable to effect communication from the fluid pressure supply means to the hydraulic motor to apply fluid pressure thereto in one position and to communicate said hydraulic motor with the reservoir in the other position for relieving said hydraulic motor of fluid pressure, an actuator operatively connected to said flow control means and responsive to a predetermined quantity of fluid whereby when said predetermined quantity of fluid is delivered to said actuator the flow control means is moved to said other position and when said predetermined quantity of fluid is removed from said actuator the flow control means is moved to said one position, flow means associated with said flow control means for communicating said fluid supply with said actuator for delivery of fluid under pressure thereto when said flow control means is in said one position and for removal of fluid from said actuator when said flow control means is in said other position, resilient means operatively connected with said actuator for urging said fluid therefrom, first and second fluid metering devices in series in said flow means whereby the volume of fluid metered thereby to said actuator is proportional to the movement of the work member, a bypass including a check valve around said second metering device whereby the flow of fluid from said actuator is metered only by said first metering device to provide a predetermined time interval between the movement of the flow control means by the actuator from said other position to said one position, a selector valve means in said flow means, a manually operable main valve in said supply and return conduits and operable when said flow control means is in said one position to selectively effect delivery of fluid pressure from said supply means to said motor and flow of fluid from said motor to said reservoir, and a selector lever means connected with said selector valve means and said main valve to selectively actuate said selector valve means to open said flow means for flow therethrough and deactivate the main valve and to actuate the selector valve means to stop flow from the flow control means through said flow means and free the main valve for manual operation.

7. In a device for controlling movement of a work member, a hydraulic motor operatively connected to the work member and responsive to fluid pressure for moving said work member, a hydraulic fluid reservoir, a pump having a connection with the reservoir and operable to supply hydraulic fluid from the reservoir under pressure, a supply conduit connecting said pump to said hydraulic motor for supplying fluid under pressure thereto, a return conduit communicating with said reservoir, a fluid pressure actuated flow control means in said supply conduit and connected to said return conduit and operative to communicate said fluid supply from the pump to said hydraulic motor in one position whereby fluid pressure is delivered to said hydraulic motor and to communicate said hydraulic motor with the reservoir in the other position for relieving said hydraulic motor of fluid pressure, a pilot valve having connections with the fluid pressure supply and to the reservoir and operable whereby in one position fluid pressure is communicated to said flow control means to move same to said other position thereof and in the other position of said pilot valve to communicate the actuating pressure of the flow control means to the reservoir, a fluid responsive extensible actuator responsive to a predetermined quantity of fluid whereby when said predetermined quantity of fluid is delivered to said actuator it is in extended position and when said predetermined quantity of fluid is removed from said actuator it is in contracted position, a lost motion connection between said actuator and said pilot valve and operative whereby as the actuator approaches its extended position the pilot valve is moved to a position to communicate fluid pressure to the flow control means to actuate same and when said actuator approaches contracted position the pilot valve is moved to communicate the actuating pressure of the flow control means to the reservoir, flow means associated with the flow control means and having communication with said actuator for supplying fluid pressure thereto when said flow control means is in said other position, and an adjustable metering device in said flow means whereby the total volume of fluid metered thereby to said actuator is proportional to the total movement of the work member and the actuator moves to its extended position at substantially the same time as the work member reaches the predetermined limit of its movement in one direction and the actuator moves said pilot valve to apply operating pressure to the flow control means to move same to said other position for flow of fluid from the hydraulic motor and the actuator.

8. In a device for controlling movement of a work member, a hydraulic motor operatively connected to the work member and responsive to fluid pressure for moving said work member, a hydraulic fluid reservoir, a pump having a connection with the reservoir and operable to supply hydraulic fluid from the reservoir under pressure, a supply conduit connecting said pump to said hydraulic motor for supplying fluid under pressure thereto, a return conduit communicating with said reservoir, a fluid pressure actuated sequence valve in said supply conduit and connected to said return conduit and operative to communicate said fluid supply from the pump to said hydraulic motor in one position whereby fluid pressure is delivered to said hydraulic motor and to communicate said hydraulic motor with the reservoir in the other position for relieving said hydraulic motor of fluid pressure, a pilot valve having connections with the fluid pressure supply and to the reservoir and operable whereby in one position fluid pressure is communicated to said sequence valve to move same to said other position thereof and in the other position of said pilot valve to communicate the actuating pressure of the sequence valve to the reservoir, resilient means in said sequence valve to move same to said one position thereof when said pilot valve communicates the actuating pressure of the sequence valve to the reservoir, a fluid responsive extensible actuator responsive to a predetermined quantity of fluid whereby when said predetermined quantity of fluid is delivered to said actuator it is in extended position and when said predetermined quantity of fluid is removed from said actuator it is in contracted position, a lost motion connection between said actuator and said pilot valve and operative whereby as the actuator approaches its extended position the pilot valve is moved to said one position and when said actuator approaches its contracted position the pilot valve is moved to its said other position, flow means associated with the sequence valve and communicating with said actuator for supplying fluid pressure thereto when said sequence valve is in said other position, adjustable first and second metering devices in said flow means in series with the second metering device having lesser flow than the first metering device whereby the volume of fluid metered thereby to said actuator is proportional to the movement of the work member and the actuator moves to its extended position at substantially the same time as the work member reaches the limit of its movement in one direction and the actuator moves said pilot valve to its said other position, and a bypass having a check valve therein around said second metering device whereby the rate of flow of fluid from said actuator through the flow line is regulated by the first metering device and thereby provides the delay in the actuator reaching its contracted position where it actuates the pilot valve and effects movement of the sequence valve to again apply fluid pressure to the hydraulic motor to start movement of the work member.

9. In a device for controlling movement of a work member subjected to force normally urging it in one direction, a hydraulic motor operatively connected to the work member and responsive to fluid pressure for overcoming said force and moving said work member in the opposite direction, a hydraulic fluid reservoir, a pump having a connection with the reservoir and operable to supply hydraulic fluid from the reservoir under pressure, a supply conduit connecting said pump to said hydraulic motor for supplying fluid under pressure thereto, a return conduit communicatinng with said reservoir, a fluid pressure actuated sequence valve in said supply conduit and connected to said return conduit and operative to communicate said fluid supply from the pump to said hydraulic motor in one position whereby fluid pressure delivered to said hydraulic motor moves said work member in said opposite direction and to communicate said hydraulic motor with the reservoir in the other position for relieving said hydraulic motor of fluid pressure whereby the force urging said work member will move same in said one direction, a pilot valve having connections with the fluid pressure supply and to the reservoir and operable whereby in one position fluid pressure is communicated to said sequence valve to move same to said other position thereof and in the other position of said pilot valve to communicate the actuating pressure of the sequence valve to the reservoir, resilient means in said sequence valve to move same to said one position thereof when said pilot valve communicates the actuating pressure of the sequence valve to the reservoir, a fluid responsive extensible actuator responsive to a predetermined quantity of fluid whereby when said predetermined quantity of fluid is delivered to said actuator it is in fully extended position and when said predetermined quantity of fluid is removed from said actuator it is in its contracted position, resilient means operatively connected with said actuator for urging same to its contracted position, a lost motion connection between said actuator and said pilot valve and operative whereby as the actuator approaches its fully extended position the pilot valve is moved to a position to communicate fluid pressure to the sequence valve to actuate same and when said actuator approaches its contracted position the pilot valve is moved to communicate the actuating pressure of the sequence valve to the reservoir, flow means communicating the sequence valve with said actuator for supplying fluid pressure thereto when said sequence valve is in said other position, adjustable first and second metering devices in said flow means in series with the second metering device having lesser flow than the first metering device whereby the volume of fluid metered thereby to said actuator is proportional to the movement of the work member and the actuator moves to its extended position at substantially the same time as the work member reaches the limit of its movement in said opposite direction and the actuator moves said pilot valve to apply operating pressure to the sequence valve to move same to said other position for flow of fluid from the hydraulic motor and the actuator, and a bypass having a check valve therein around said second metering device whereby the rate of flow of fluid from said actuator through the flow line is regulated by the first metering device and thereby provides the delay in the actuator reaching its contracted position where it actuates the pilot valve and effects movement of the sequence valve to again apply fluid pressure to the hydraulic motor to start movement of the work member in said opposite direction.

10. In a device for controlling movement of a work member subjected to force normally urging it in one direction, a hydraulic motor operatively connected to the work member and responsive to fluid pressure for overcoming said force and moving said work member in the opposite direction, a hydraulic fluid reservoir, a pump having a connection with the reservoir and operable to supply hydraulic fluid from the reservoir under pressure, a supply conduit connecting said pump to said hydraulic motor for supplying fluid under pressure thereto, a return conduit communicating with said reservoir, a fluid pressure actuated sequence valve in said supply conduit and connected to said return conduit and operative to communicate said fluid supply from the pump to said hydraulic motor in one position whereby fluid pressure delivered to said hydraulic motor moves said work member in said opposite direction and to communicate said hydraulic motor with the reservoir in the other position for relieving said hydraulic motor of fluid pressure whereby the force urging said work member will move same in said one direction, a pilot valve having connections with the fluid pressure supply and to the reservoir and operable whereby in one position fluid pressure is communicated to said sequence valve to move same to said other position thereof and in the other position of said pilot valve to communicate the actuating pressure of the sequence valve to the reservoir, resilient means in said sequence valve to move same to said one position thereof when said pilot valve communicates the actuating pressure of the sequence valve to the reservoir, a fluid responsive extensible actuator responsive to a predetermined quantity of fluid whereby when said predetermined quantity of fluid is delivered to said actuator it is in extended position and when said predetermined quantity of fluid is removed from said actuator it is in its contracted position, a lost motion connection between said actuator and said pilot valve and operative whereby as the actuator approaches its extended position the pilot valve is moved to said one position and when said actuator approaches its contracted position the pilot valve is moved to its said other position, flow means associated with the sequence valve and having communication with said actuator for supplying fluid pressure thereto when said sequence valve is in said other position, an adjustable metering device in said flow means whereby the volume of fluid metered thereby to said actuator is proportional to the movement of the work member and the actuator moves to its extended position at substantially the same time as the work member reaches the limit of its movement in said opposite direction and the actuator moves said pilot valve to its said other position, a selector valve means in said flow means, a manually operable main valve in said supply and return conduits and operable to selectively effect delivering of fluid pressure from said pressure supply pump to said hydraulic motor and flow of fluid from said hydraulic motor to said reservoir, and a selector lever means connected with said selector valve and said main valve and operable to selectively actuate said selector valve to open said flow means for flow therethrough and deactivate the main valve.

11. In a device for controlling movement of a work member subjected to force normally urging it in one direction, a hydraulic motor operatively connected to the work member and responsive to fluid pressure for overcoming said force and moving said work member in the opposite direction, a hydraulic fluid reservoir, a pump having a connection with the reservoir and operable to supply hydraulic fluid from the reservoir under pressure, a supply conduit connecting said pump to said hydraulic motor for supplying fluid under pressure thereto, a return conduit communicating with said reservoir, a fluid pressure actuated sequence valve in said supply conduit and connected to said return conduit and operative to communicate said fluid supply from the pump to said hydraulic motor in one position whereby fluid pressure delivered to said hydraulic motor moves said work member in said opposite direction and to communicate said hydraulic motor with the reservoir in the other position for relieving said hydraulic motor of fluid pressure whereby the force urging said work member will move same in said one direction, a pilot valve having connections with the fluid pressure supply and to the reservoir and operable whereby in one position fluid pressure is communicated to said sequence valve to move same to said other position thereof and in the other position of said pilot valve to communicate the actuating pressure of the sequence valve to the reservoir, resilient means in said sequence valve to move same to said one position thereof when said pilot valve communicates the actuating pressure of the sequence valve to the reservoir, a fluid responsive extensible actuator responsive to a predetermined quantity of fluid whereby when said predetermined quantity of fluid is delivered to said actuator it is in fully extended position and when said predetermined quantity of fluid is removed from said actuator it is in its contracted position, resilient means operatively connected with said actuator for urging same to its contracted position, a lost motion connection between said actuator and said pilot valve and operative whereby as the actuator approaches its fully extended position the pilot valve is moved to a position to communicate fluid pressure to the sequence valve to actuate same and when said actuator approaches its contracted position the pilot valve is moved to communicate the actuating pressure of the sequence valve to the reservoir, flow means communicating the sequence valve with said actuator for supplying fluid pressure thereto when said sequence valve is in said other position, adjustable first and second metering devices in said flow means in series with the second metering device having lesser flow than the first metering device whereby the total volume of fluid metered thereby to said actuator is proportional to the total selected movement of the work member and the actuator moves to its extended position at substantially the same time as the work member reaches the limit of its movement in said opposite direction and the actuator moves said pilot valve to apply operating pressure to the sequence valve to move same to said other position for flow of fluid from the hydraulic motor and the actuator, a bypass having a check valve therein around said second metering device whereby the rate of flow of fluid from said actuator through the flow line is regulated by the first metering device and thereby provides the delay in the actuator reaching its contracted position where it actuates the pilot valve and effects movement of the sequence valve to again apply fluid pressure to the hydraulic motor to start movement of the work member in said opposite direction, a selector valve means in said flow means, a manually operable main valve in said supply and return conduits and operable when said flow control sequence valve is in said one position to selectively effect delivering of fluid pressure from said pressure supply pump to said hydraulic motor and flow of fluid from said hydraulic motor to said reservoir independently of said sequence valve, and a selector lever means connected with said selector valve and said main valve and operable to selectively actuate said selector valve to open said flow means for flow therethrough and deactivate the main valve and to actuate the selector valve to stop flow from the sequence valve through said flow means and free the main valve for manual operation.

References Cited in the file of this patent

UNITED STATES PATENTS

| | | |
|---|---|---|
| 1,510,205 | Beaty | Sept. 30, 1924 |
| 1,549,206 | Miller | Aug. 11, 1925 |
| 2,276,358 | Vickers | Mar. 17, 1942 |
| 2,361,460 | Daugherty | Oct. 31, 1944 |
| 2,613,703 | Calvert | Oct. 14, 1952 |